Patented July 23, 1929.

1,722,026

UNITED STATES PATENT OFFICE.

HENRY J. WEILAND AND IVAN GUBELMANN, OF SOUTH MILWAUKEE, WISCONSIN, ASSIGNORS TO THE NEWPORT COMPANY, OF CARROLLVILLE, WISCONSIN, A CORPORATION OF DELAWARE.

PROCESS OF OBTAINING ALPHA-NAPHTHYLAMINE FROM A MIXTURE OF ALPHA AND BETA NAPHTHYLAMINES.

No Drawing.    Application filed June 28, 1926. Serial No. 119,250.

This invention relates to a process of obtaining alpha-naphthylamine in a substantially pure state from a mixture of alpha and beta naphthylamines.

It is a well-known fact that in the nitration of naphthalene there results in the nitration product a small percentage of beta-nitronaphthalene. Up to the present time, no known method has been devised to prevent the formation of small quantities of the beta-nitronaphthalene in the nitration process. Since, in the subsequent reduction step to form the amine, this beta-nitronaphthalene is also reduced, it appears as an impurity in the final product in the form of beta-naphthylamine. In fact, all alpha naphthylamine sold in the United States today that has come to our attention and has been analyzed by us shows the presence of substantial quantities, as high as 5%, of beta naphthylamine.

It is, therefore, an object of our invention to provide a process of obtaining substantially pure alpha naphthylamine by separation from the beta-naphthylamine present as an impurity in the nitronaphthalene reduction mass.

It is a further object of this invention to provide a method for directly obtaining substantially pure alpha naphthylamine in its basic state from commercial alpha-naphthylamine containing relatively small quantities of beta-naphthylamine.

Other and further important objects of this invention will appear hereafter from the following description and from the appended claims.

We have found that if a mixture of alpha-naphthylamine and beta naphthylamine containing a small percentage of beta-naphthylamine, up to 15%, is treated in a suitable dispersion medium with a quantity of dilute acid in the proportion of 3 to 4 moles of acid to 1 mole of beta-naphthylamine present, the beta-naphthylamine is converted almost entirely into the corresponding salt, whereas the alpha-naphthylamine remains for the most part in the basic state. Any acid such as nitric or acetic will give the desired result, provided both alpha- and beta-naphthylamine are soluble in the acid chosen. Hydrochloric acid, however, has been found to be the most satisfactory acid for the purpose. The mixture of alpha and beta-naphthylamines is suspended in a dispersion medium, such as water, and the acid added while agitating the mixture.

Without limiting our invention to any particular procedure, the following example illustrates the application of our invention in the preferred form:

To 143 grams (1 mole) of alpha-naphthylamine containing about 5% of beta-naphthylamine are added 1000 grams of water and the entire mass is heated up to 50° C. 18.5 grams (0.19 moles) of hydrochloric acid (37.5–38%) are now added while agitating the mass. After the acid is all in, the mass is cooled down over a period of 3–5 hours to a temperature of 20° C. Pure alpha-naphthylamine will crystallize out during this cooling process in steel-gray crystals and the beta-naphthylamine present in the original crude will be left in the aqueous acid solution. The alpha-naphthylamine crystals are filtered from the aqueous solution and washed with 150 grams of cold water, and the wash is united with the original mother liquor. To the combined filtrate and wash water are added 2.5 grams of concentrated sulfuric acid, upon the addition of which the beta-naphthylamine is precipitated quantitatively in the form of the sulfate and may be filtered off. The recovery of the beta-naphthylamine is practically quantitative. The beta-naphthylamine may be recovered from the sulfate by suspending the sulfate in 100 grams of water and basing by the addition of caustic soda or ammonia. The melting point of the beta-naphthylamine after filtering and drying was found to be 110° C.

The alpha-naphthylamine crystals recovered as described above will contain less than 1% of beta-naphthylamine.

We are aware that numerous details of the process may be varied without departing from the spirit of this invention and we do not desire limiting the patent granted other than as necessitated by the prior art.

We claim as our invention:

1. The process of obtaining substantially pure alpha naphthylamine from a mixture of alpha-naphthylamine and beta-naphthylamine, which comprises adding sufficient acid to said mixture in a dispersion medium to convert substantially all of the beta-naphthylamine into its corresponding salt dissolved in said dispersion medium, said acid being adapted to form soluble salts with both the alpha- and beta-naphthylamine, and separating alpha-naphthylamine in solid form from the solution thus formed.

2. The process of obtaining substantially pure alpha-naphthylamine from a mixture of alpha-naphthylamine and beta-naphthylamine, which comprises adding to said mixture in a dispersion medium sufficient hydrochloric acid to convert substantially all of the beta-naphthylamine into its corresponding salt dissolved in said dispersion medium, and separating alpha-naphthylamine in solid form from the solution thus formed.

3. The process of obtaining substantially pure alpha-naphthylamine from a mixture of alpha-naphthylamine and beta-naphthylamine containing less than 15% of beta-naphthylamine, which comprises adding to said mixture in a dispersion medium sufficient acid to convert substantially all of the beta-naphthylamine into its corresponding soluble salt and separating alpha-naphthylamine in solid form from the solution thus formed.

4. The process of obtaining substantially pure alpha-naphthylamine from a mixture of alpha- and beta-naphthylamines, which comprises treating a water suspension of the mixture with a quantity of acid sufficient to substantially convert all of the beta-naphthylamine into its corresponding soluble salt, said acid being adapted to form soluble salts with both the alpha- and beta-naphthylamines, and isolating alpha-naphthylamine from the solution thus formed.

5. The process of separating alpha-naphthylamine from a mixture of alpha- and beta-naphthylamines, which comprises treating said mixture in a dispersion medium to convert substantially all of the beta-naphthylamine into its corresponding soluble salt and separating alpha-naphthylamine in solid state from the solution of the salt thus formed.

6. The process of obtaining substantially pure alpha-naphthylamine from a mixture of alpha- and beta- naphthylamines, containing less than 15% of beta-naphthylamine, which comprises treating said mixture in a dispersion medium with a quantity of acid sufficient to convert substantially all of the beta-naphthylamine into its corresponding soluble salt and separating alpha-naphthylamine in solid state from the solution of the salt thus formed.

7. The process of separating alpha-naphthylamine from a mixture of alpha- and beta-naphthylamines, containing less than 15% of beta-naphthylamine, which comprises treating said mixture in a dispersion medium with a quantity of acid sufficient to convert substantially all of the beta-naphthylamine into its corresponding soluble salt, crystallizing the alpha-naphthylamine, and isolating the alpha-naphthylamine crystals.

8. The process of obtaining substantially pure alpha naphthylamine from a mixture of alpha- and beta-naphthylamines containing a small percentage of beta-naphthylamine, which comprises treating the mixture in water suspension at an elevated temperature with a sufficient quantity of hydrochloric acid to convert the beta-naphthylamine into its soluble salt, cooling the mass until separation of alpha-naphthylamine crystals takes place and separating the alpha-naphthylamine crystals from the dissolved beta-naphthylamine salt.

9. The process of obtaining substantially pure alpha-naphthylamine from a mixture of alpha- and beta-naphthylamines containing a small percentage of beta-naphthylamine, which comprises treating the mixture in water suspension at an elevated temperature with approximately four times the quantity of acid required theoretically to convert the beta-naphthylamine into its corresponding soluble salt, cooling the mass until separation of alpha-naphthylamine crystals takes place and separating the alpha-naphthylamine crystals from the dissolved beta-naphthylamine salt.

10. The process of obtaining substantially pure alpha-naphthylamine from a mixture of alpha- and beta-naphthylamines, the beta-naphthylamine being present in an amount less than 15% of the mixture, which comprises treating the mixture in water suspension at an elevated temperature with a quantity of acid sufficient to convert the beta naphthylamine into its corresponding water soluble salt while leaving the alpha-naphthylamine largely in the basic state, cooling the mass until separation of the alpha-naphthylamine crystals takes place and isolating the alpha-naphthylamine from the solution directly in the form of the base.

In testimony whereof, we have hereunto subscribed our names.

HENRY J. WEILAND.
IVAN GUBELMANN.